(12) United States Patent
Salam et al.

(10) Patent No.: US 11,935,299 B2
(45) Date of Patent: Mar. 19, 2024

(54) DECODING LIGHT-BASED MESSAGES TO SUPPORT DEVICE MAINTENANCE

(71) Applicant: Cisco Technology, Inc., San Jose, CA (US)

(72) Inventors: Samer Salam, Beirut (LB); Jad Al Aaraj, Irvine, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/716,288

(22) Filed: Apr. 8, 2022

(65) Prior Publication Data
US 2023/0326209 A1  Oct. 12, 2023

(51) Int. Cl.
| | |
|---|---|
| G06V 10/25 | (2022.01) |
| G06T 3/40 | (2006.01) |
| G06T 5/00 | (2006.01) |
| G06V 10/74 | (2022.01) |
| G06V 20/40 | (2022.01) |
| H04B 10/116 | (2013.01) |

(52) U.S. Cl.
CPC ............... *G06V 20/46* (2022.01); *G06T 3/40* (2013.01); *G06T 5/002* (2013.01); *G06V 10/25* (2022.01); *G06V 10/761* (2022.01); *H04B 10/116* (2013.01); *G06T 2207/10016* (2013.01)

(58) Field of Classification Search
None
See application file for complete search history.

(56) References Cited

U.S. PATENT DOCUMENTS

| | | | |
|---|---|---|---|
| 7,646,934 B2 | 1/2010 | Hing et al. | |
| 9,082,202 B2 | 7/2015 | Kovesi et al. | |
| 10,284,293 B2 | 5/2019 | Bitra et al. | |
| 2016/0080635 A1* | 3/2016 | Ishii | H04N 25/704 |
| | | | 348/353 |
| 2019/0114753 A1* | 4/2019 | Li | G06T 7/194 |

(Continued)

FOREIGN PATENT DOCUMENTS

CN    108288289    7/2018

OTHER PUBLICATIONS

"Visible Light Communication", online: https://en.wikipedia.org/wiki/Visible_light_communication, Mar. 28, 2022, accessed Apr. 1, 2022, 6 pages, Wikimedia Foundation, Inc.

(Continued)

*Primary Examiner* — Randolph I Chu
(74) *Attorney, Agent, or Firm* — BEHMKE INNOVATION GROUP LLC; James M. Behmke; James J. Wong

(57) ABSTRACT

In one embodiment, a first device identifies a region of interest in video in which a light source of a second device is present by: using a current frame of the video and a prior frame of the video to compute a difference frame, performing thresholding on the current frame to form a threshold frame, and performing pixel-wise conjunction operations between the difference frame and the threshold frame, to identify a centroid of the light source of the second device. The first device detects a message within the region of interest transmitted by the second device via its light source. The device provides the message for review by a user.

20 Claims, 7 Drawing Sheets

(56) References Cited

U.S. PATENT DOCUMENTS

2019/0295290 A1* 9/2019 Schena .............. G06Q 10/0875
2022/0365211 A1* 11/2022 Wang ...................... G01S 17/06

OTHER PUBLICATIONS

Zhuang, et al., "A Survey of Positioning Systems Using Visible LED Lights", IEEE Communications Surveys & Tutorials, Feb. 2018, 29 pages, IEEE.

Ahuja, et al., "LightAnchors: Appropriating Point Lights for Spatially-Anchored Augmented Reality Interfaces", UIST '19, Oct. 20-23, 2019, 8 pages, Association of Computing Machinery, New Orleans, LA, USA.

Sharma, et al., "All that GLITTERs: Low-Power Spoof-Resilient Optical Markers for Augmented Reality", 2020 19th ACM/IEEE International Conference on Information Processing in Sensor Networks (IPSN), Apr. 2020, pp. 289-300, IEEE, Sydney, NSW, Australia.

Yang, et al., "InfoLED: Augmenting LED Indicator Lights for Device Positioning and Communication", UIST '19, Oct. 20-23, 2019, 13 pages, ACM, New Orleans, LA, USA.

Yang, et al., "InfoLed: Augmenting LED Indicator Lights for Device Positioning and Communication", online: https://www.youtube.com/watch?v=NTBTHwg4WdM, Oct. 2019, accessed Apr. 6, 2022, 8 pages, YouTube.

* cited by examiner

DECODING LIGHT-BASED MESSAGES TO SUPPORT DEVICE MAINTENANCE

TECHNICAL FIELD

The present disclosure relates generally to computer networks, and, more particularly, to decoding light-based messages to support device maintenance.

BACKGROUND

The Internet of Things, or "IoT" for short, represents an evolution of computer networks that seeks to connect many everyday objects to the Internet. Notably, there has been a recent proliferation of 'smart' devices that are Internet-capable such as thermostats, lighting, televisions, cameras, and the like. In many implementations, these devices may also communicate with one another.

As the sheer volume of devices increases, network maintenance and network field operations, becomes more challenging. This can be equally true in datacenters, as well as in the various IoT deployments. For instance, say a technician has been deployed to a location with many devices. Identifying the specific device of interest from among the many devices may be difficult. In addition, certain devices may be located in hard-to-reach places, such as mounted on the ceiling, on a pole, or the like.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
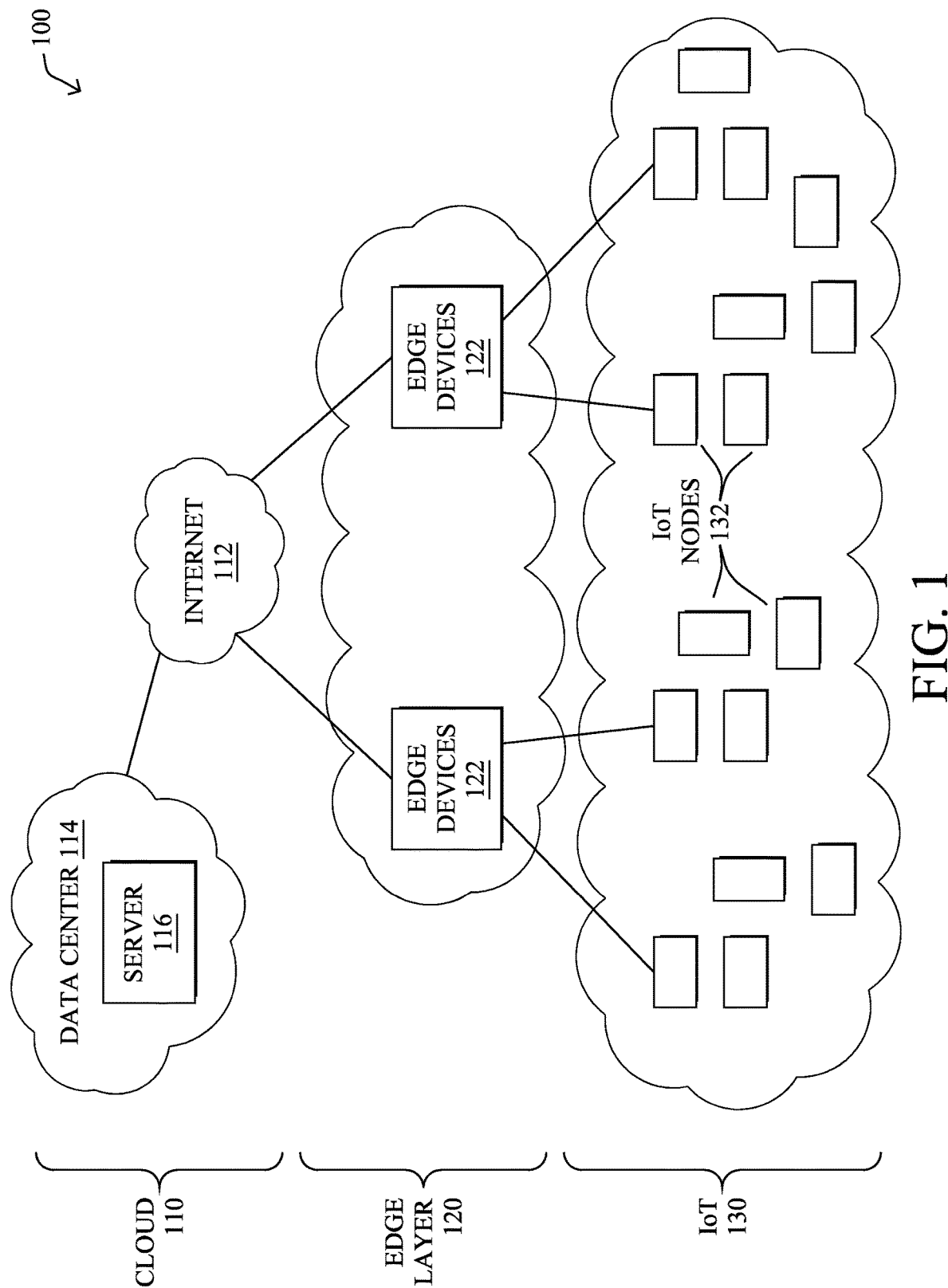
FIG. 1 illustrate an example network.

According to one or more embodiments of the disclosure, a first device identifies a region of interest in video in which a light source of a second device is present by: using a current frame of the video and a prior frame of the video to compute a difference frame, performing thresholding on the current frame to form a threshold frame, and performing pixel-wise conjunction operations between the difference frame and the threshold frame, to identify a centroid of the light source of the second device. The first device detects a message within the region of interest transmitted by the second device via its light source. The device provides the message for review by a user.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. Other types of networks, such as field area networks (FANs), neighborhood area networks (NANs), personal area networks (PANs), etc. may also make up the components of any given computer network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the IoT involves the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh networks, such as wireless or PLC networks, etc., and are often on what is referred to as Low-Power and Lossy Networks (LLNs), which are a class of network in which both the routers and their interconnect are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Edge computing, also sometimes referred to as "fog" computing, is a distributed approach of cloud implementation that acts as an intermediate layer from local networks (e.g., IoT networks) to the cloud (e.g., centralized and/or shared resources, as will be understood by those skilled in the art). That is, generally, edge computing entails using devices at the network edge to provide application services, including computation, networking, and storage, to the local nodes in the network, in contrast to cloud-based approaches that rely on remote data centers/cloud environments for the services. To this end, an edge node is a functional node that is deployed close to IoT endpoints to provide computing, storage, and networking resources and services. Multiple edge nodes organized or configured together form an edge compute system, to implement a particular solution. Edge nodes and edge systems can have the same or complementary capabilities, in various implementations. That is, each individual edge node does not have to implement the entire spectrum of capabilities. Instead, the edge capabilities may be distributed across multiple edge nodes and systems, which may collaborate to help each other to provide the desired services. In other words, an edge system can include any number of virtualized services and/or data stores that are spread across the distributed edge nodes. This may include a master-slave configuration, publish-subscribe configuration, or peer-to-peer configuration.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);
2) Links are generally low bandwidth, such that control plane traffic must generally be bounded and negligible compared to the low rate data traffic;
3) There are a number of use cases that require specifying a set of link and node metrics, some of them being dynamic, thus requiring specific smoothing functions to avoid routing instability, considerably draining bandwidth and energy;
4) Constraint-routing may be required by some applications, e.g., to establish routing paths that will avoid non-encrypted links, nodes running low on energy, etc.;
5) Scale of the networks may become very large, e.g., on the order of several thousands to millions of nodes; and
6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid advanced metering infrastructure (AMI), smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

FIG. 1 is a schematic block diagram of an example simplified computer network 100 illustratively comprising nodes/devices at various levels of the network, interconnected by various methods of communication. For instance, the links may be wired links or shared media (e.g., wireless links, PLC links, etc.) where certain nodes, such as, e.g., routers, sensors, computers, etc., may be in communication with other devices, e.g., based on connectivity, distance, signal strength, current operational status, location, etc.

Specifically, as shown in the example IoT network 100, three illustrative layers are shown, namely cloud layer 110, edge layer 120, and IoT device layer 130. Illustratively, the cloud layer 110 may comprise general connectivity via the Internet 112, and may contain one or more datacenters 114 with one or more centralized servers 116 or other devices, as will be appreciated by those skilled in the art. Within the edge layer 120, various edge devices 122 may perform various data processing functions locally, as opposed to datacenter/cloud-based servers or on the endpoint IoT nodes 132 themselves of IoT device layer 130. For example, edge devices 122 may include edge routers and/or other networking devices that provide connectivity between cloud layer 110 and IoT device layer 130. Data packets (e.g., traffic and/or messages sent between the devices/nodes) may be exchanged among the nodes/devices of the computer network 100 using predefined network communication protocols such as certain known wired protocols, wireless protocols, PLC protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Data packets (e.g., traffic and/or messages) may be exchanged among the nodes/devices of the computer network 100 using predefined network communication protocols such as certain known wired protocols, wireless protocols (e.g., IEEE Std. 802.15.4, Wi-Fi, Bluetooth®, DECT-Ultra Low Energy, LoRa, etc.), PLC protocols, or other shared-media protocols where appropriate. In this context, a protocol consists of a set of rules defining how the nodes interact with each other.

Figure 2:
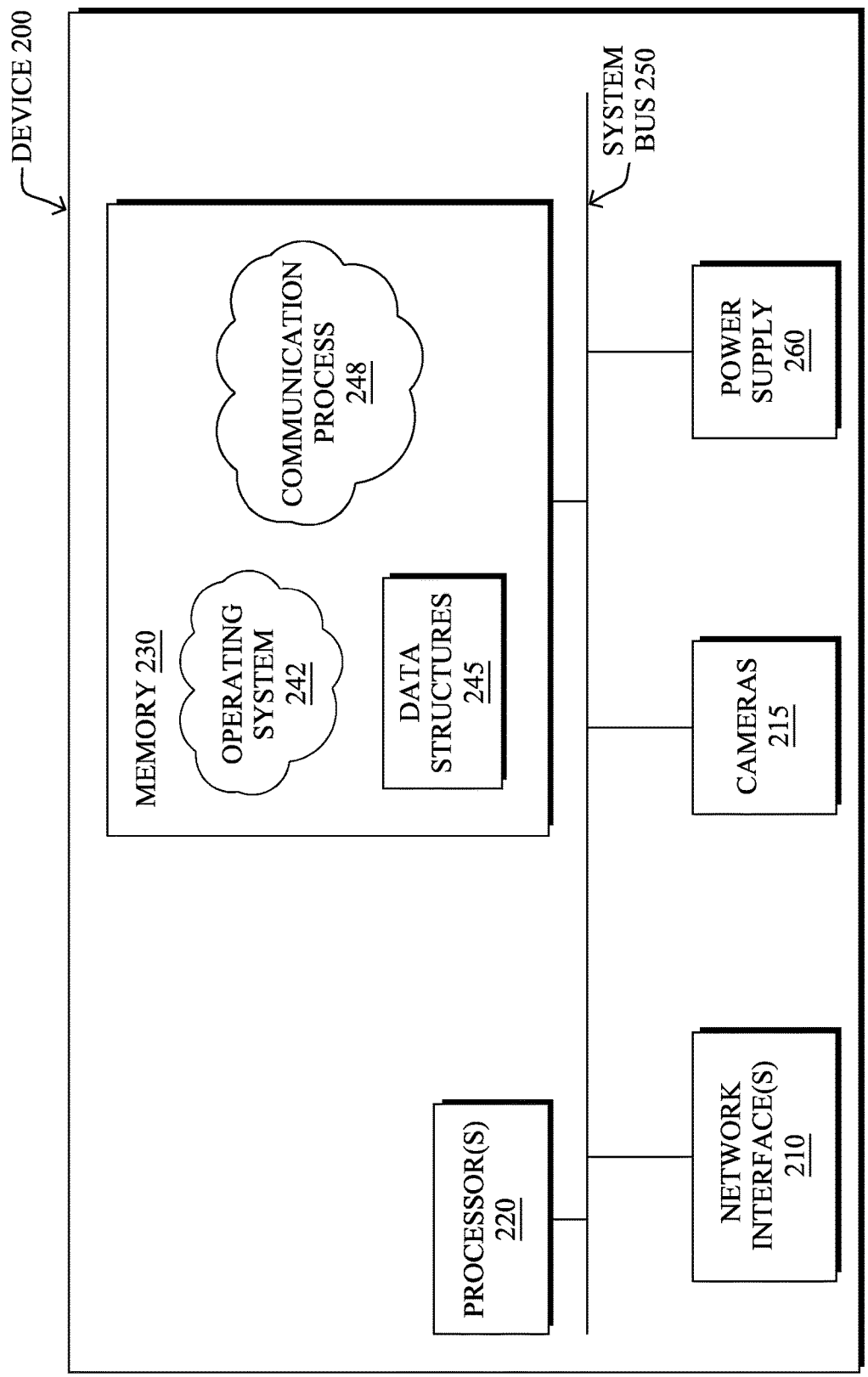
FIG. 2 illustrates an example network device/node.

FIG. 2 is a schematic block diagram of an example node/device 200 (e.g., an apparatus) that may be used with one or more embodiments described herein, e.g., as any of the nodes or devices shown in FIG. 1 above or described in further detail below (e.g., a client device, an access point, a network controller, etc.). The device 200 may comprise one or more network interfaces 210 (e.g., wired, wireless, PLC, etc.), one or more cameras 215, at least one processor 220, and a memory 240 interconnected by a system bus 250, as well as a power supply 260 (e.g., battery, plug-in, etc.).

Network interface(s) 210 include the mechanical, electrical, and signaling circuitry for communicating data over links coupled to the network. The network interfaces 210 may be configured to transmit and/or receive data using a variety of different communication protocols, such as TCP/IP, UDP, etc. Note that the device 200 may have multiple different types of network connections, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes/services may comprise an illustrative communication process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

As noted above, with the proliferation of the IoT, the number of devices both in the field and in datacenters continues to rise at an unprecedented rate. This presents a number of challenges when a technician is sent to perform maintenance on a device. For instance, in a datacenter, there may be hundreds of devices that all look alike, making it difficult for the technician to identify the specific device of interest.

Figure 3:
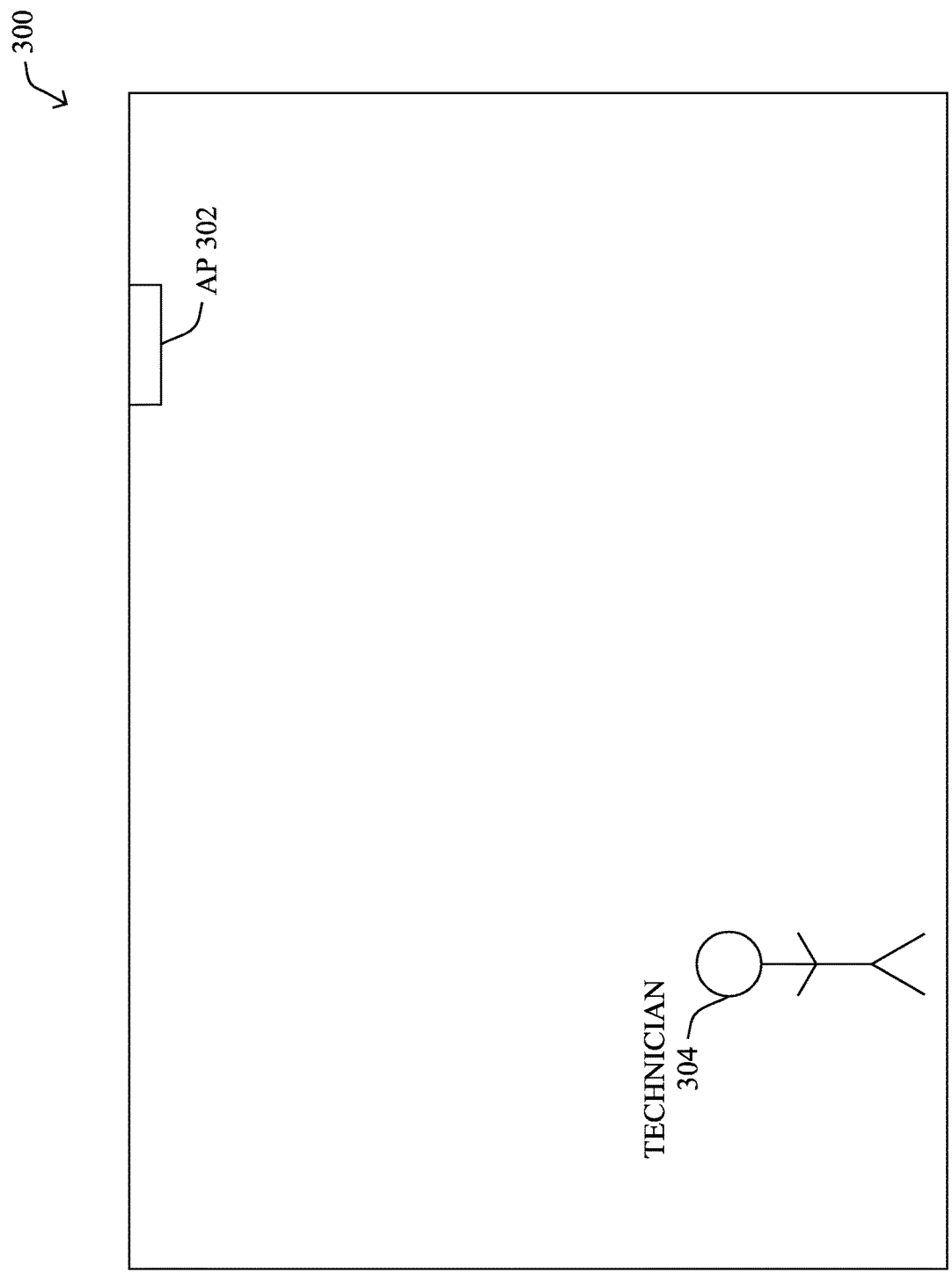
FIG. 3 illustrates an example of a technician being sent to perform maintenance on an overhead wireless access point.

In addition, the target device may be located at a location that makes accessing the device difficult. For instance, consider the example shown in FIG. 3. As shown, assume that there is a networking device, such as access point 302, located in an area 300, that requires maintenance. Such maintenance may include, but is not limited to, any or all of the following:
- The device becoming unreachable via the network
- The device requiring physical maintenance (e.g., replacement of a battery, replacement of a card, etc.)
- Routine status checks (e.g., as required by policy or regulation)
- Etc.

In this instance, technician 304 may have difficulty finding AP 302 due to its location (e.g., mounted to the ceiling in area 300 or at a high location). In addition, physically accessing AP 302 could also prove challenging, such as requiring technician 304 to first find a ladder and then climb it.

In various embodiments, one potential way to aid technicians would be to leverage light-based communications, such as visible light communication (VLC). Generally, VLC entails using visible light to convey data between devices. Here, a key observation is that many existing devices already include one or more light sources, such as light emitting diodes (LEDs), that are externally-facing. For instance, FIG. 4 illustrates an example view 400 of the face of AP 302.

Figure 4:
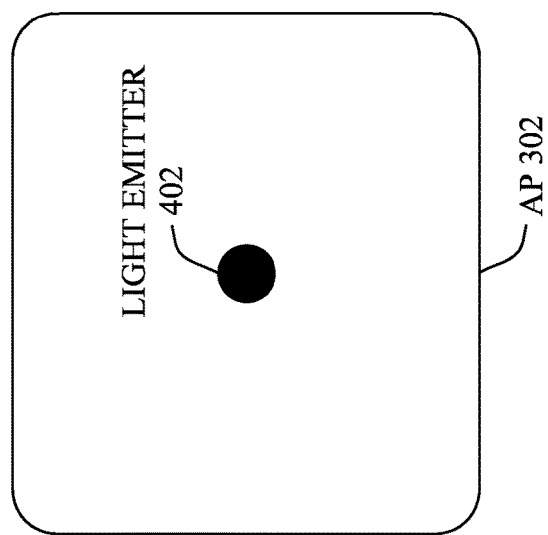
FIG. 4 illustrates an example wireless access point.

As shown in FIG. 4, AP 302 may include an external light emitter 402 (e.g., an LED) that could be leveraged for light-based communications. Typically, light emitter 402 may be configured to provide very basic visual indications as to the status of AP 302. For instance, external light emitter 402 may be configured to blink or remain red, when there are certain issues, such as AP 302 not being able to access the network, may blink or remain yellow when trying to establish connectivity, and may blink or remain green, when network connectivity has been established.

A key idea here is that the light emitters of devices, such as external light emitter 402 of AP 302, may be leveraged to provide not just visual indicia of very basic information, but used to actually convey full messages that can be decoded by a remote device. For instance, the blinking pattern of external light emitter 402 could be controlled in a manner that conveys information in a form similar to traditional network packets. This allows external light emitter 402 to transmit more complex messages, which could include preambles, payloads, and/or parity bits, that can be decoded by the receiving device.

Of course, new devices could be designed to include both the hardware (e.g., one or more externally-facing LEDs) and software required to support light-based communications with a remote device. In addition, since many existing devices that have already been deployed also include the requisite hardware, they can be easily configured to support these types of communications as well, such as by pushing a firmware or other software update to them. Thus, an already-deployed device such as AP 302 could be upgraded to support light-based communications via its external light emitter 402 with a software update.

Figure 5:
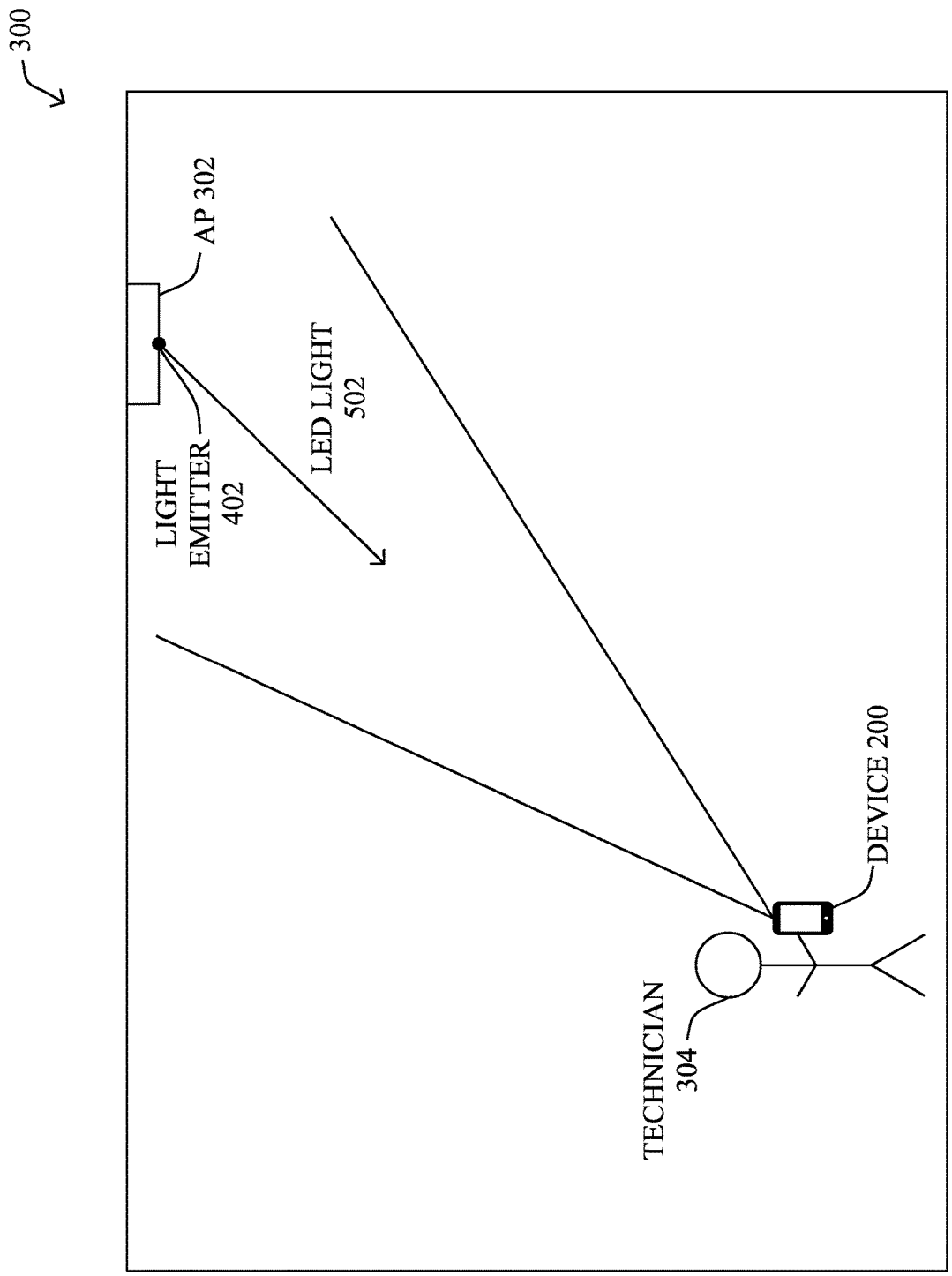
FIG. 5 illustrates an example of the technician of FIG. 3 operating a device that receives and decodes light-based messages from the wireless access point.

FIG. 5 illustrates an example of technician 304 operating a device 200 that receives and decodes light-based messages from AP 302, in various embodiments. Referring again to the scenario previously depicted in FIG. 3, assume now the following:

1. AP 302 has been configured to encode and send light-based messages via its external light emitter 402.
2. Technician 304 operates a device 200 that has been configured to capture video of LED light 502 emitted by AP 302. In turn, device 200 then decodes the message from the captured video and presents the message to technician 304 (e.g., through execution of its communication process 248). This can be done, for instance, via a display of device 200, one or more speakers of device 200, and/or by providing the message data to another device in communication with device 200 (e.g., a heads up display worn by technician 304, etc.).

In some embodiments, device 200 may present the light-based messages from AP 302 sent via LED light 502 for display to technician 304 as part of an augmented reality (AR) display. As would be appreciated, AR displays typically overlay information on top of a view of the real world, thereby 'augmenting' what the user would normally see. Thus, in the case of technician 304, device 200 could present information to technician 304 regarding AP 302, such as a device identifier (e.g., to help technician 304 distinguish AP 302 from other nearby devices), status information regarding AP 302 (e.g., error codes, telemetry and/or log information, etc.), or the like.

While some light-based communication techniques exist today, there are certain challenges that remain with respect to using such techniques in the scenario depicted in FIG. 5 and others like that. These challenges may include any or all of the following:

The distances between devices (e.g., between AP 302 and device 200) in maintenance scenarios may be much larger than in other light-based communication use cases.

Since device 200 will be carried or worn by its user, such as technician 304, some degree of shaking of device 200 is inevitable during its video capture of AP 302. Combined with the potential distances involved, this can make decoding of the message encoded in LED light 502 particularly difficult, as the location of light emitter 402 within the frames of the video captured by device 200 will change over time.

In addition to the region of interest within the captured video frames (i.e., where light emitter 402 appears) changing over time, the initial region of interest is also typically unknown, thus requiring device 200 to detect it.

The lighting conditions in area 300 may also be varying and are unlikely to be known a priori.

The reflective nature of the material of the faceplate of AP 302 or other external surface of external light emitter 402 also needs to be taken into account.

Finally, there is also the potential for device 200 to pick up random noise when capturing the video of external light emitter 402.

——Decoding Light-Based Messages to Support Device Maintenance——

The techniques introduced herein address all of the above challenges, as well as others, in a lightweight manner that could even be executed solely on the CPU of a mobile device (e.g., without requiring GPU-based processing). In some aspects, a region of interest is identified within the video frames of the transmitting device in which its light emitter is located. This can be done, for instance, by applying a pixel-wise conjunctive operation (i.e., a logical AND operation) on the threshold difference of consecutive video frames and those of down-sampled frames.

Illustratively, the techniques described herein may be performed by hardware, software, and/or firmware, such as in accordance with communication process 248, which may include computer executable instructions executed by the processor 220 (or independent processor of interfaces 210) to perform functions relating to the techniques described herein.

Specifically, in various embodiments, a first device identifies a region of interest in video in which a light source of a second device is present by: using a current frame of the video and a prior frame of the video to compute a difference frame, performing thresholding on the current frame to form a threshold frame, and performing pixel-wise conjunction operations between the difference frame and the threshold frame, to identify a centroid of the light source of the second device. The first device detects a message within the region of interest transmitted by the second device via its light source. The device provides the message for review by a user.

Figure 6:
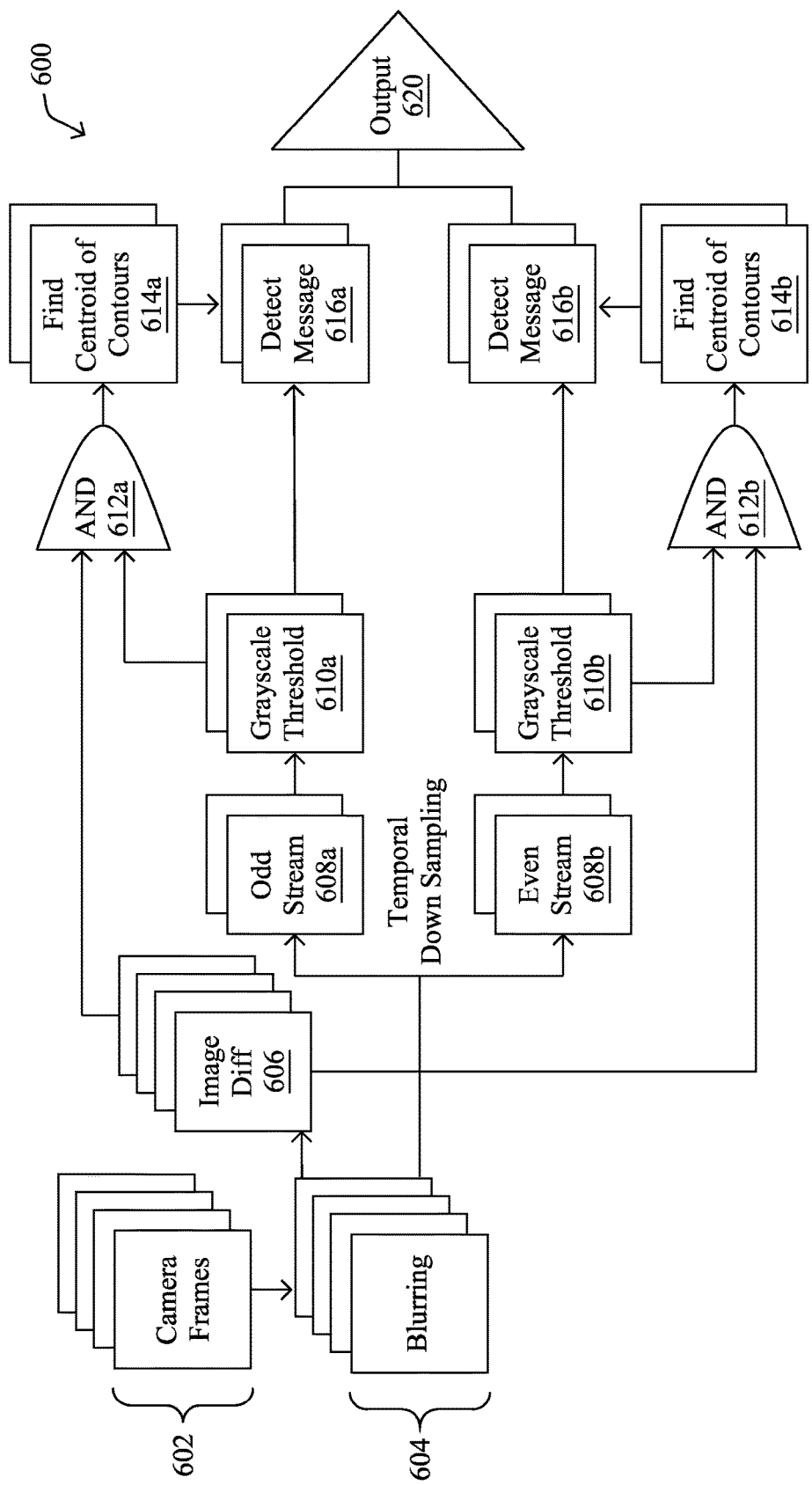
FIG. 6 illustrates an example architecture for decoding light-based messages.

Operationally, FIG. 6 illustrates an example architecture 600 for decoding light-based messages, according to various embodiments. Such an architecture 600 may be used, for instance, to implement communication process 248. As would be appreciated, while architecture 600 may be implemented entirely on a singular device (e.g., device 200), further embodiments provide for architecture 600 to be implemented in a distributed manner with certain components of architecture 600 executed on device 200 and other components executed elsewhere.

As shown, the input for architecture 600 may be video data that takes the form of camera frames 602 captured by one or more cameras of the local device 200 and/or another device. Generally, camera frames 602 may be sequential in nature, corresponding to the point in time in which they were captured. In addition, each camera frame in camera frames 602 may comprise any number of pixels, depending on the resolution of the capturing camera(s). Each pixel has associated information with it, such as the color information for that pixel (e.g., values for the degree of red, green, and blue present in that pixel), if the cameras are configured to capture color images, luminosity values, etc.

In various embodiments, the system may subject camera frames 602 to a blurring filter 604. In general, blurring filter 604 may be configured to spread the luminosities in camera frames 602 over a wider area of pixels. As a result, the luminosities of the pixels associated with the light source of the transmitting device may be spread over a wider area in the frames. This allows architecture 600 to better tolerate shaking/motion of the camera during capture of camera frames 602 and identify the light source across camera frames 602. In one embodiment, the frames may also be converted into a single, grayscale channel at this stage, as well (e.g., if camera frames 602 are captured in color).

Once blurring filter 604 has completed its processing of a frame, that frame may be added to a cache so as to construct a history of consecutive frames. In turn, in various embodiments, an image difference computation engine 606 may compute the differences between every two consecutive grayscale frames in the history, thereby outputting difference frames that represent the differences between these two frames (e.g., in terms of their luminosities, etc.). In other embodiments, architecture may instead perform analysis on color frames, such as by converting red-green-blue (RGB) values to hue, saturation, value (HSV) information for processing.

In various embodiments, architecture 600 may also compute aggregate information for the luminosity values for each of the frames in the history cache. For instance, such information may indicate the minimum, maximum, mean, etc. luminosities per frame and/or across the entire history. In turn, in some embodiments, architecture 600 may use this information to compute a threshold/cutoff value for the luminosity. In one embodiment, the threshold/cutoff value may be based on the mean luminosity of the history. In another embodiment, it may be set as the maximum luminosity of all frames across the history, minus a sensitivity value, which may be predefined or set by an administrator or dynamically established.

In some embodiments, image difference computation engine 606 may apply thresholding to its computed difference frames. In general, this thresholding may zero out those frame pixels that are below the threshold and maximize the luminosities of the pixels above the threshold. The result of applying such thresholding to the difference frames (i.e., the difference between two consecutive frames in the history cache) should yield the region of interest within the frame that corresponds to the location of the light source of the transmitting device within that frame. In other words, the light source is likely to correspond to the set of pixels in the frame with the highest luminosity values.

In various embodiments, architecture 600 may also apply temporal down sampling to the original set of (grayscale) frames from blurring filter 604. Doing so can help to eliminate the adverse effects of pixel saturation on the camera sensor. For instance, architecture 600 may temporally down sample the frames by separating them into an odd stream 608a and even stream 608b of the frames from blurring filter 604. Thus, given a stream of frames $f_1$, $f_2$, $f_3$, $f_4$, etc. that are in sequential order according to when they were captured, odd stream 608a may include $f_1$, $f_3$, etc. and even stream 608b may include $f_2$, $f_4$, etc. In some embodiments, architecture 600 may then separately apply thresholding using the threshold computed above to streams 608a-608b via threshold engines 610a-610b, respectively. A dilation operation could also be applied at this time, to increase the area of the bright pixels of the thresholded frames.

Effectively, the temporal down sampling of the frames by architecture 600 results in two parallel pipelines: one that processes odd stream 608a and another that processes even stream 608b. Of course, other down sampling approaches could also be used, in other embodiments (e.g., separating the frames into three pipelines, four pipelines, etc.).

In various embodiments, each of the data pipelines of architecture 600 may apply a conjunction operation (i.e., a logical AND operation) on a pixel-wise basis between the thresholded frames in that pipeline and the thresholded difference frames from image difference computation engine 606. More specifically, as shown, an AND operation 612a may be applied to the current thresholded frame from threshold engine 610a and the thresholded difference frame from image difference computation engine 606. Similarly, an AND operation 612b may be applied to the current thresholded frame from threshold engine 610b and the thresholded difference frame from image difference computation engine 606. In general, these conjunction operations can also help to eliminate random noise to a high degree.

In turn, each of the data pipelines of architecture 600 may also include region of interest detectors 614a-614b, respectively, which operate to identify the region of interest within the resulting frames from AND operations 612a-612b, respectively. In various embodiments, region of interest detectors 614a-614b may do so by leveraging contour-finding algorithms and determining the centroid of the identified contour(s). In other words, region of interest detectors 614a-614b may evaluate the results of the conjunction operations to identify the light source of the transmitting device and its centroid across the various frames.

In various embodiments, architecture 600 may then apply message detectors 616a-616b as part of its respective data pipelines, to detect the message data being sent by the transmitting device. More specifically, a message detector 616 may assess the current thresholded frame in its data pipeline (e.g., from the threshold engine 610) at the region of interest identified by the region of interest detector 614 in its pipeline. For instance, the message detector 616 may evaluate the centroid pixel position indicated by region of interest detector 614 in the current frame in the pipeline, to extract out the message data (e.g., based on the blinks, luminosities, etc. of the light source).

In turn, architecture 600 may then combine the results of message detectors 616 into the decoded message and send the message as output 620 for review by a user, in various embodiments. For instance, the full message may include preamble, payload, and/or parity bits of the transmitted message, which may convey information such as the identity of the transmitting device, telemetry data, status data, health data, or the like from the transmitting device, or the like, any or all of which can be presented to the user for display. In further embodiments, architecture 600 may also apply various interpretation rules to the message, to form output 620, such as by interpreting the sent information, adding contextual or other information to the message, or the like.

As would be appreciated, output 620 may be sent to any number of user interfaces, either local to the device implementing architecture 600 and/or other devices in communication therewith. For instance, in one embodiment, output 620 may be sent to an augmented reality (AR) display as an overlay. For instance, output 620 may be presented as an overlay over certain ones of camera frames 602, thereby allowing the user to not only view the transmitting device in real time, but also the message(s) sent by that device. In other embodiments, output 620 may be sent as audio data to one or more speakers, one or more displays and/or speakers of another device, etc., for review by the user.

In summary, the techniques herein are able to overcome many of the various challenges in using light-based communications for maintenance of deployed (networking) devices, such as by performing a pixel-wise AND operation on the threshold difference frames and the temporally down sampled threshold grayscale frames, in order to determine the centroid of the contour line of the transmitting LED or other light source. In turn, the pixel position of that centroid can be used as the region of interest used to decode the message. This effectively allows decoding device to determine the region of interest within the video frames with high reliability in the presence of camera movements, noise, and pixel saturation, even at longer distances (e.g., tens of feet away from the transmitting device).

Figure 7:
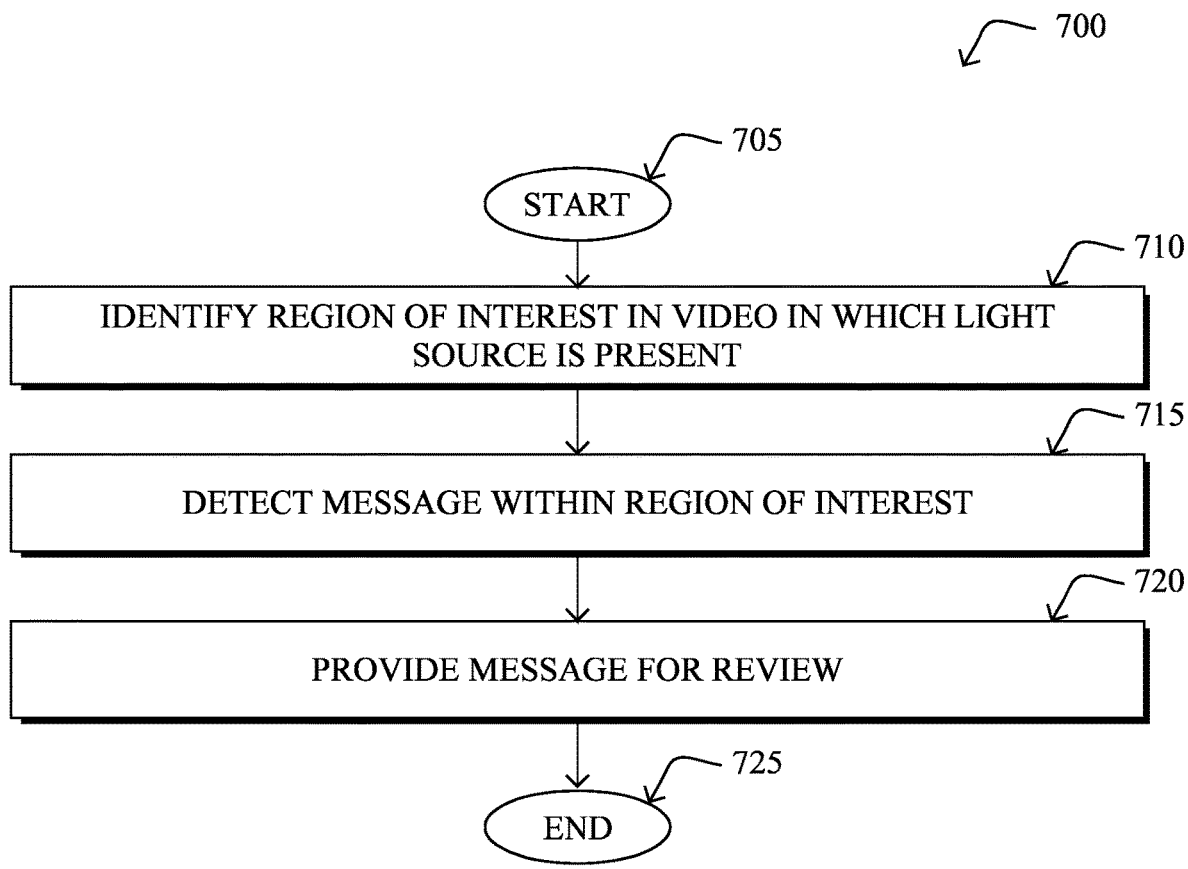
FIG. 7 illustrates an example simplified procedure for decoding a light-based message.

FIG. 7 illustrates an example simplified procedure for decoding a light-based message, in accordance with one or more embodiments described herein. The procedure 700 may start at step 705, and continues to step 710, where, as described in greater detail above, a specifically-configured, first device (e.g., a device 200 executing communication process 248) may identify a region of interest in video in which a light source of a second device is present. In various embodiments, the first device may do so by using a current frame of the video and a prior frame of the video to compute a difference frame, performing thresholding on the current frame to form a threshold frame, and performing pixel-wise conjunction operations between the difference frame and the threshold frame, to identify a centroid of the light source of the second device. In some embodiments, the current frame and the prior frame are grayscale frames (e.g., converted to grayscale by the first device, captured as grayscale, etc.).

In some embodiments, the first device may also temporally down sample the video into even and odd streams of frames, wherein the current frame and the prior frame both belong to one of those streams. In other embodiments, the first device may also apply a blurring filter to the video, to spread luminosity of the light source a wider area of pixels of the current frame, prior to computing the difference frame. In various embodiments, the thresholding performed by the first device may include zeroing out luminosities of pixels that are below a threshold value, and maximizing luminosities of pixels that are above the threshold value. In one embodiment, the first device may also perform the thresholding on the difference frame. In various embodiments, the threshold value may be based on a mean luminosity of a history of frames of the video or based on a maximum luminosity of the history of frames minus a sensitivity value.

At step 715, as detailed above, the first device may detect a message within the region of interest transmitted by the second device via its light source. In some embodiments, the message includes an identifier for the second device. This may allow a user of the first device to quickly identify the second device as being of interest. In further cases, the message may include telemetry, diagnostics, or other health data for the second device, allowing the user to also review the status of the second device, remotely.

At step 720, as detailed above, the first device may provide the message for review by a user. In some embodiments, the message is provided for review by the user via an augmented reality display of the first device. In further embodiments, the first device may provide the message for review via a non-augmented reality display, as audio via a speaker, as a message sent to another device, or the like. Procedure 700 then ends at step 725.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

While there have been shown and described illustrative embodiments for decoding light-based messages to support device maintenance, it is to be understood that various other adaptations and modifications may be made within the intent and scope of the embodiments herein. For example, while specific protocols are used herein for illustrative purposes, other protocols and protocol connectors could be used with the techniques herein, as desired. Further, while the techniques herein are described as being performed in certain settings, such as a factory or warehouse, the techniques are not limited as such and can be deployed in any number of different settings.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method comprising:
  identifying, by a first device, a region of interest in video in which a light source of a second device is present by:
    using a current frame of the video and a prior frame of the video to compute a difference frame,
    performing thresholding on the current frame to form a threshold frame, and
    performing pixel-wise conjunction operations by applying a logical AND operation on a pixel-wise basis between the difference frame and the threshold frame, to identify a centroid of the light source of the second device;
  detecting, by the first device, a message within the region of interest transmitted by the second device via its light source; and
  providing, by the first device, the message for review by a user.

2. The method as in claim 1, wherein the message is provided for review by the user via an augmented reality display of the first device.

3. The method as in claim 1, wherein identifying the region of interest further comprises:
  temporally down sampling the video into even and odd streams of frames, wherein the current frame and the prior frame both belong to one of those streams.

4. The method as in claim 1, wherein identifying the region of interest further comprises:
  applying a blurring filter to the video, to spread luminosity of the light source a wider area of pixels of the current frame, prior to computing the difference frame.

5. The method as in claim 1, wherein the message includes an identifier for the second device.

6. The method as in claim 1, wherein the current frame and the prior frame are grayscale frames.

7. The method as in claim 1, wherein the thresholding comprises:
  zeroing out luminosities of pixels that are below a threshold value; and
  maximizing luminosities of pixels that are above the threshold value.

8. The method as in claim 7, wherein using a current frame of the video and a prior frame of the video to compute a difference frame comprises:
  performing the thresholding on the difference frame.

9. The method as in claim 7, wherein the threshold value is based on a mean luminosity of a history of frames of the video or based on a maximum luminosity of the history of frames minus a sensitivity value.

10. The method as in claim 1, wherein the threshold frame is a temporally down sampled grayscale frame, such that the logical AND operation is performed between the difference frame and the temporally down sampled grayscale frame.

11. An apparatus, comprising:
  one or more network interfaces;
  a processor coupled to the one or more network interfaces and configured to execute one or more processes; and
  a memory configured to store a process that is executable by the processor, the process when executed configured to:
    identify a region of interest in video in which a light source of a device is present by:
      using a current frame of the video and a prior frame of the video to compute a difference frame,
      performing thresholding on the current frame to form a threshold frame, and
      performing pixel-wise conjunction operations by applying a logical AND operation on a pixel-wise basis between the difference frame and the threshold frame, to identify a centroid of the light source of the device;
    detect a message within the region of interest transmitted by the device via its light source; and
    provide the message for review by a user.

12. The apparatus as in claim 11, wherein the message is provided for review by the user via an augmented reality display of the apparatus.

13. The apparatus as in claim 11, wherein the apparatus identifies the region of interest further by:
  temporally down sampling the video into even and odd streams of frames, wherein the current frame and the prior frame both belong to one of those streams.

14. The apparatus as in claim 11, wherein the apparatus identifies the region of interest further by:
  applying a blurring filter to the video, to spread luminosity of the light source a wider area of pixels of the current frame, prior to computing the difference frame.

15. The apparatus as in claim 11, wherein the message includes an identifier for the device.

16. The apparatus as in claim 11, wherein the current frame and the prior frame are gray scale frames.

17. The apparatus as in claim 11, wherein the thresholding comprises:
   zeroing out luminosities of pixels that are below a threshold value; and
   maximizing luminosities of pixels that are above the threshold value.

18. The apparatus as in claim 17, wherein the apparatus uses a current frame of the video and a prior frame of the video to compute a difference frame by:
   performing the thresholding on the difference frame.

19. The apparatus as in claim 17, wherein the threshold value is based on a mean luminosity of a history of frames of the video or based on a maximum luminosity of the history of frames minus a sensitivity value.

20. A tangible, non-transitory, computer-readable medium storing program instructions that cause a first device to execute a process comprising:
   identifying, by the first device, a region of interest in video in which a light source of a second device is present by:
      using a current frame of the video and a prior frame of the video to compute a difference frame,
      performing thresholding on the current frame to form a threshold frame, and
      performing pixel-wise conjunction operations by applying a logical AND operation on a pixel-wise basis between the difference frame and the threshold frame, to identify a centroid of the light source of the second device;
   detecting, by the first device, a message within the region of interest transmitted by the second device via its light source; and
   providing, by the first device, the message for review by a user.

* * * * *